(12) United States Patent
Richard et al.

(10) Patent No.: US 9,534,134 B2
(45) Date of Patent: Jan. 3, 2017

(54) AGENT FOR THE SURFACE EPILAMIZATION OF AN ARTICLE

(71) Applicant: THE SWATCH GROUP RESEARCH AND DEVELOPMENT LTD, Marin (CH)

(72) Inventors: David Richard, Yverdon-les-Bains (CH); Christophe Letondor, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 186 days.

(21) Appl. No.: 14/413,097

(22) PCT Filed: Jun. 4, 2013

(86) PCT No.: PCT/EP2013/061435
§ 371 (c)(1),
(2) Date: Jan. 6, 2015

(87) PCT Pub. No.: WO2014/009058
PCT Pub. Date: Jan. 16, 2014

(65) Prior Publication Data
US 2015/0197661 A1 Jul. 16, 2015

(30) Foreign Application Priority Data
Jul. 10, 2012 (EP) .................................. 12175783

(51) Int. Cl.
| | | |
|---|---|---|
| B32B 9/04 | (2006.01) |
| C09D 133/16 | (2006.01) |
| C10M 107/28 | (2006.01) |
| C10M 107/38 | (2006.01) |
| C10M 107/40 | (2006.01) |
| C10M 107/48 | (2006.01) |
| C10M 107/50 | (2006.01) |
| C09D 1/00 | (2006.01) |
| G04B 99/00 | (2006.01) |

(52) U.S. Cl.
CPC .............. C09D 133/16 (2013.01); C09D 1/00 (2013.01); C10M 107/28 (2013.01); C10M 107/38 (2013.01); C10M 107/40 (2013.01); C10M 107/48 (2013.01); C10M 107/50 (2013.01); G04B 99/00 (2013.01); C10M 2209/0845 (2013.01); C10M 2213/0606 (2013.01); C10M 2217/065 (2013.01); C10M 2225/0405 (2013.01); C10M 2229/003 (2013.01); C10N 2220/028 (2013.01); C10N 2230/06 (2013.01); C10N 2240/06 (2013.01); C10N 2250/121 (2013.01); C10N 2280/00 (2013.01); Y10T 428/3154 (2015.04)

(58) Field of Classification Search
CPC ............................................ Y10T 428/31504
See application file for complete search history.

(56) References Cited

U.S. PATENT DOCUMENTS

| | | | | |
|---|---|---|---|---|
| 2007/0286993 A1* | 12/2007 | Radcliffe | ................ | G02B 1/111 428/212 |
| 2010/0310875 A1* | 12/2010 | Hao | ..................... | C08G 65/007 428/413 |
| 2011/0305872 A1* | 12/2011 | Li | .......................... | A61L 29/06 428/141 |
| 2012/0009429 A1* | 1/2012 | Shmueli | .............. | C03C 17/3411 428/447 |
| 2012/0021200 A1* | 1/2012 | Koberstein | .......... | C08G 77/045 428/220 |
| 2013/0251930 A1* | 9/2013 | Dahlke | ................. | C07C 17/275 428/36.9 |

FOREIGN PATENT DOCUMENTS

| | | |
|---|---|---|
| JP | 2001-288233 A | 10/2001 |
| JP | 2003-335829 A | 11/2003 |
| WO | 2012/085130 A1 | 6/2012 |

OTHER PUBLICATIONS

International Search Report issued in corresponding application PCT/EP2013/061435, completed Sep. 13, 2013 and mailed Oct. 14, 2013.
Ganapathy, Hullathy Subban, "Stabilizer architectures based on fluorinated random and block copolymers for the dispersion polynlerization of 2-hydroxyethyl methacrylate in supercritical carbon dioxide," J Mater Sci, 2008, published online Oct. 4, 2007, pp. 2300-2306.
IPRP issued in corresponding application PCT/EP2013/061435, completed Sep. 14, 2014 with Annexes.

* cited by examiner

*Primary Examiner* — Gregory Webb
(74) *Attorney, Agent, or Firm* — Oblon, McClelland, Maier & Neustadt, L.L.P.

(57) ABSTRACT

The present invention relates to an agent in particular for the surface epilamization of an article comprising one or more molecules having the general formula (1)

A-F   (1)

wherein:
A is an anchor group comprising a moiety selected from the group consisting of silane groups, hydroxyl groups, catechol groups, phosphate groups, phosphonate groups, carboxylic acid groups, amine groups, thiol groups and any combination of two or more of the aforementioned groups and
F is a functionalizing group, wherein the functionalizing group com-prises a branched polymer having a backbone and at least two side groups, wherein at least one of the side groups is a C1-20 hydrocarbon group or a perhalogenated C1-20 hydrocarbon group.
The invention pertains to the technical field of epilame for timepiece mechanical parts.

15 Claims, No Drawings

AGENT FOR THE SURFACE EPILAMIZATION OF AN ARTICLE

This is a National Phase Application in the United States of International patent Application PCT/EP2013/061435 filed Jun. 4, 2013, which claims priority on European patent Application 12175783.5 filed Jul. 10, 2012. The entire disclosures of the above patent applications are hereby incorporated herein by reference.

FIELD OF THE INVENTION

The present invention relates to an agent in particular for the surface modification of an article, such as for the epilamization of the surface of an article. Moreover, the present invention relates to the use of such an agent, to an article having a surface being coated with such an agent, to a method for producing such an article as well as to the use of such an article.

BACKGROUND OF THE INVENTION

Various methods for the surface modification of an article by the treatment with an appropriate agent are known in the prior art in order to achieve an improvement of specific surface properties. For example, in the technical field of mechanical engineering, such as in particular in the technical field of watchmaking, epilamization of an article surface is often performed, in order to control and reduce the surface energy of the article surface during its use.

However, substances used for epilamization so far have various disadvantages. More specifically, the known epilames lead to epilamized article surfaces having an inferior resistance towards cleaning. Additionally, the known epilames cannot be coupled to the article surface in a sufficient density and thickness, which is necessary to achieve excellent and long term epilamization effects. Furthermore, known epilames may cause negative aesthetic effects on the surface due to interference phenomena and due to the formation of spots on the article surface. Moreover, known epilames usually have a limited applicability to different surface materials, i.e. their use is restricted to specific surface materials only. Therefore, there is a need for epilames which overcome the aforementioned limitations and which are for example more flexible with regard to the surface material, i.e. which can be applied on a variety of different surface materials.

SUMMARY OF THE INVENTION

Consequently, the object underlying the present invention is to provide an improved agent, which is suitable for the surface epilamization of an article, wherein the agent is capable of at least one of forming on the surface a coating layer having an improved uniformity of molecules of the agent, forming a coating layer having an improved density of molecules of the agent, forming a coating layer having a higher thickness, forming a coating layer having a better resistance towards cleaning and/or forming a coating layer having improved aesthetic properties.

According to the present invention this object is solved by providing an agent which comprises one or more molecules having the general formula (1).

$$A\text{-}F \quad (1)$$

wherein:

A is an anchor group comprising a moiety selected from the group consisting of silane groups, hydroxyl groups, catechol groups, phos-phate groups, phosphonate groups, carboxylic acid groups, amine groups, thiol groups and any combination of two or more of the aforementioned groups and F is a functionalizing group, wherein the functionalizing group comprises a branched polymer having a backbone and at least two side groups, wherein at least one of the side groups is a C1-20 hydrocar-bon group or a perhalogenated C1-20 hydrocarbon group.

This solution bases on the surprising finding that such an agent can, due to its anchor groups and branched polymer group, be firmly and uniformly bonded with a high molecule density on the surface of the article. Thus, said agent has a high scratch mechanical resistance and a high cleaning resistance.

Moreover, the agent according to the present invention can be easily optimized concerning its properties, such as concerning its adherence to the surface material, because the anchor group can be chosen for this purpose independently from the nature of the functionalizing group.

Apart from that, due to the firm bonding of the agent to the article surface, the modified article surface provides an excellent resistance towards cleaning. In addition, a layer of such an agent on a surface exhibits excellent aesthetic properties.

Without wishing to be bound to any theory, the aforementioned excellent surface properties may be attributed to an improved packing of the molecules of the agent according to the present invention on the surface of the article and to an increased density of carbon atoms which is achieved by using an agent having a functionalizing group which comprises a branched polymer. Indeed, the packing of molecules can be precisely controlled and, incidentally, the thickness of the branched polymers can be reliably produced. Moreover, branched polymers allow the use of multi-monomers with localized functionalization, i.e. by selective UV exposure, polymerization may occur only at predetermined location. Finally, branched polymers permit to highly tune the cross-linking with another molecule.

Since the anchor group can be selected from a broad variety of functional groups, the anchor group of the A-F molecules may be chosen to optimize its adherence on a specific surface material.

Therefore, the agent according to the present invention can be applied to a variety of different surface materials by appropriately selecting the anchor group. In addition to the aforementioned tailoring of the agent to a specific substrate, the agent can be easily and efficiently prepared directly or indirectly on the surface to be modified. For this purpose, a polymerization method is suitable, in which an anchor group A, which is appropriate for the selected material.

Thus, anchor group A can be bound to the surface, thereafter the functionalizing group is synthesized via a graft polymerization of the monomers onto the anchor group to form the A-F of the agent or the functionalizing group is synthesized via a graft polymerization of the monomers onto the anchor group A, thereafter anchor group A is bound to the surface to form the A-F of the agent according to alternative embodiments of the present invention.

Particularly in the case that the branched polymer of the functionalizing group F is partially fluorinated or even perfluorinated, the agent according to the present invention is excellently suitable to be used as an epilame which provides an oil repellent layer on a substrate. This advantage is due to the controlled density of the agent. Indeed, branched polymers imply a high density and heterogeneous distribution (side groups have various directions) in a pre-determined volume.

The type of hydrocarbon group which is used in the present invention is not subject to special limitations, but comprises unsubstituted hydrocarbon groups as well as any kind of substituted hydrocarbon group. Thus, the term hydrocarbon group is not limited to groups consisting of carbon and hydrogen atoms only, but also extends to groups which also comprise other substituents, like e.g. a halogen substituent or an ester group.

A catechol group according to the present invention comprises a 1,2-dihydroxybenzene group and any substituted 1,2-dihydroxybenzene group, such as a dopamine group or a nitrodopamine group.

The term "anchor group comprising an amine group" comprises according to the present invention also polyamine-derived anchor groups. Thus, in the present invention such an anchor group may contain a structural unit which is derived from a polyamine, i.e. from a compound which contains more than one terminal amino group and optionally contains one or more secondary and/or tertiary amino groups.

As set out above, the functionalizing group F comprises the branched polymer. Preferably, the functionalizing group F consists of the branched polymer, i.e. does not contain any further group in addition to the branched polymer.

Particular good results both, with respect to epilamization, are in particular obtained, if the at least one of the side groups is a C2-18 hydrocarbon group, preferably a C4-17 hydrocarbon group, more preferably a C6-16 hydrocarbon group and most preferably a C8-14 hydrocarbon group.

According to a further embodiment of the present invention, it is preferred that at least 50%, preferably at least 80%, more preferably at least 90% and most preferably all of the side groups are a hydrocarbon group, wherein the hydrocarbon groups are preferably C1-20 hydrocarbon groups, more preferably C2-18 hydrocarbon groups, even more preferably C4-17 hydrocarbon groups, still more preferably C6-16 hydrocarbon groups and most preferably C8-14 hydrocarbon groups.

In dependency from the desired properties of the agent, the at least one side group may be an unsubstituted hydrocarbon group, i.e. a hydrocarbon group comprising exclusively C—H bonds, or a substituted hydrocarbon group. In principle, all substituted hydrocarbon groups can be used, wherein particular good results are obtained if the substituted hydrocarbon group is an alkyl ester group and preferably an unsubstituted alkyl ester group. The agent includes, as epilame function, at least one side group is a partially fluorinated hydrocarbon group and preferably a perfluorinated hydrocarbon group.

According to a further preferred embodiment of the present invention, the hydrocarbon group is selected from the group consisting of alkyl groups, alkenyl groups, alkynyl groups, aryl groups, alkylaryl groups, arylalkyl groups, alkenylaryl groups, arylalkenyl groups, alkynylaryl groups, ar-ylalkynyl groups, alkyl ester groups, alkenyl ester groups, alkynyl ester groups, aryl ester groups, alkylaryl ester groups, arylalkyl ester groups, alkenylaryl ester groups, arylalkenyl ester groups, alkynylaryl ester groups, arylalkynyl ester groups and any combination of two or more of the aforementioned groups. All of the alkyl groups, alkenyl groups and alkynyl groups may be linear, branched or cyclic.

Preferably, the hydrocarbon group is an alkyl ester group and more preferably a linear alkylester group.

Non limiting examples for alkylester groups are hydrocarbon groups, which are selected from the group consisting of acrylate esters, methacrylate esters, styrene derivatives having at least one alkyl group attached to the aromatic ring and any combination of two or more of the aforementioned groups.

Alternatively to the aforementioned alkyl ester group, for certain application, it may be preferable that the hydrocarbon group is an arylalkyl or an alkylaryl group and even more preferably a linear arylalkyl or a linear al-kylaryl group.

The agent according to the present patent application preferably includes a branched polymer that comprises 2 to 50, more preferably 3 to 30, even more preferably 4 to 20, still more preferably 5 to 15 and most preferably 7 to 13 side groups.

In this embodiment, all of the side groups are the same or different and preferably C1-12 hydrocarbon groups, more preferably C2-10 hydrocarbon groups, furthermore preferably C3-9 hydrocarbon groups and most prefer-ably C4-8 hydrocarbon groups.

Moreover, in particular in the aforementioned embodiment, it is preferred that all of the side groups are partially fluorinated hydrocarbon groups and more preferably perfluorinated hydrocarbon groups.

In order to provide a sufficiently thick layer for providing the desired properties to the modified surface, the agent according to the present invention preferably has a certain length. Accordingly, it is preferred that the length of the backbone of the agent is within a range of from 10 to 300 nm, more preferably of from 50 to 250 nm, even more preferably of from 100 to 200 nm and most preferably of from 120 to 180 nm.

According to a further particularly preferred embodiment of the present invention, at least one of the side groups of the branched polymer of the functionalizing group F has at least one functional group which is capable of cross-linking with another molecule of the agent having the general formula (1). Such a crosslinking improves the wear resistance of the branched polymer and is thus in particular preferred. If a plurality of crosslinking groups is present in the branched polymer, these crosslinking groups can be distributed statistically over the molecule or may be distributed in blocks.

In order to achieve a sufficient crosslinking density it is preferred that the branched polymer comprises at least one block comprising at least 5 and preferably at least 10 side groups, wherein at least 2 of these side groups comprise each at least one functional group which is capable of cross-linking with another molecule of the agent having the general formula (1).

Alternatively and even more preferably, the branched polymer contains at least one further block comprising at least 5 and preferably at least 10 side groups, wherein all side groups of this at least one further block do not contain functional groups being capable of cross-linking with another molecule of the branched polymer.

Alternatively and even more preferably, the branched polymer contains two of the further blocks each of which comprising at least 5 and preferably at least 10 side groups, wherein all side groups of these further blocks do not contain functional groups being capable of cross-linking with another molecule of the branched polymer, wherein the block comprising at least 5 and preferably at least 10 side groups, wherein at least 2 of these side groups comprise each at least one functional group which is capable of crosslinking with another molecule of the agent having the general formula (1), is arranged between the two further blocks.

A further subject matter of the present invention is an article comprising a substrate having at least one surface, wherein at least one of the at least one surface is coated with the above mentioned agent.

In order to effect a firm adherence of the agent on the surface, at least one of the anchor groups of the molecules of the agent having the general formula (1) is bonded to the surface of the substrate. Even if a physical bonding or a bonding via ionic groups is possible, it is preferred that at least one of the anchor groups of the molecules of the agent having the general the formula (1) is covalently bonded to the surface of the substrate.

In principle, the agent according to the present invention can be bonded to every substrate. Non-limiting examples for suitable substrate materials are those selected from the group consisting of silicon, diamond-like carbon, silicon carbide, sapphire, steel, metal-coated steel, nickel-plated steel, ruby, aluminium oxide, iron oxide, a magnesium alloy, silicon oxide, niobium oxide, titanium oxide, a polymer and any combination of two or more of the aforementioned materials.

Of course, the type of anchor group determines the adherence of the agent according to the present invention the specific substrate, so that the anchor group has to be selected in dependency of the substrate material. Good results for substrates made of silicon, silicon carbide, sapphire and diamond like carbon are e.g. obtained with a silane group containing anchor group, whereas a suitable example for an anchor group for substrates made of steels, metals, ruby, aluminium oxide and iron oxide is a nitrodopamine group. Moreover, phosphate groups and phosphonate groups are suitable anchor groups particularly for substrates made of magnesium alloys, carboxylic acid groups are suitable anchor groups particularly for substrates made of steel and iron oxides, polyamine groups are suitable anchor groups particularly for substrates made of oxides of silicon, niobium, titanium and/or aluminium, and thiol groups are suitable anchor groups particularly for substrates made of gold.

A further subject matter of the present invention is a method for producing the aforementioned article comprising the steps of:

(a) providing a substrate having at least one surface, (b) bonding at least one anchor group selected from the group consisting of silane groups, hydroxyl groups, catechol groups, phosphate groups, phosphonate groups, carboxylic acid groups, amine groups, thiol groups and any combination of two or more of the aforementioned groups onto at least one of the at least one surface of the substrate, (c) providing at least one kind of monomer and (d) graft polymerizing the at least one kind of monomer onto the at least one anchor group to form a branched polymer, which is covalently bonded to the at least one anchor group.

According to a first alternative, the method according to the invention for producing the aforementioned article comprises the steps of:

(c') providing at least one kind of monomer, (d') graft polymerizing the at least one kind of monomer onto the at least one anchor group selected from the group consisting of silane groups, hydroxyl groups, catechol groups, phosphate groups, phosphonate groups, carboxylic acid groups, amine groups, thiol groups and any combination of two or more of the aforementioned groups to form a branched polymer, which is covalently bonded to the at least one anchor group, (a') providing a substrate having at least one surface and (b') bonding said at least one anchor group onto at least one of the at least one surface of the substrate.

According to a second alternative, the method according to the invention for producing the aforementioned article comprises the steps of:

(d') graft polymerizing the at least one kind of monomer in order to form at least one branched polymer, (a) providing a substrate having at least one surface, (b) bonding at least one anchor group selected from the group consisting of silane groups, hydroxyl groups, catechol groups, phosphate groups, phosphonate groups, carboxylic acid groups, amine groups, thiol groups and any combination of two or more of the aforementioned groups onto at least one of the at least one surface of the substrate and (e) bonding said at least one branched polymer onto said at least one anchor group.

The branched polymer may also be manufactured with a surface-Initiated Oxygen-Tolerant ARGET ATRP Synthesis.

ARGET ATRP polymerisation reactions were carried out using only CuBr2 and never Fe-based salts, irrespectively of the substrate type. In order to obtain a well-defined (limited) amount of air in contact with the solution, before adding any liquid reagents, the initiator-functionalised wafer is placed in a reaction flask (20 mL Schlenk tube, small 5 ml round-bottom flask or a 20 ml flat bottom vial) which is then sealed with a rubber septum.

The solid reagents, CuBr2 (5 mg, 0.022 mmol) and 4,4'-Dinonyl-2,2'-bipyridine (44 mg, 0.11 mmol), were added to a 100 mL flask connected to a Schlenk. Afterwards the air was removed by applying three cycles of vacuum and backfilling with nitrogen—this was done to attain control over the ratio of oxygen and reducing agent present in the system. The vacuum is pumped each time for at least 2 minutes. Further 19 mL of inhibitor-free monomer (dodecyl methacrylate) was added to a sealed flask (simply by syringe from the monomer bottle) and vigorously stirred at 110° C. for at least 5 minutes until the mixture appears light purple and the ligand is completely dissolved. In order to ease the injection of the viscous reducing agent (Sn(ethyl hexanoate)2 1.4 mL, 4.34 mmol) into the sealed reaction flask, it is diluted with 2.3 mL of ultra-dry anisole (99.7% anhydrous, Sigma-Aldrich) in a separate glass container (unsealed).

The reducing agent-solvent solution is then injected into the hot mixture of monomer, CuBr2 and ligand, and at this moment the complete reacting mixture is obtained. After 5 minutes maximum of vigorous stirring at 110° C., the desired volume of light yellow-brown liquid solution is then transferred into the closed reaction flask containing initiator-functionalized wafers.

There are two variants of how the reaction was carried out: with air-filled (more simple) or with nitrogen-filled (requires atmosphere exchange by cycling vacuum-nitrogen) substrate containing flasks. If the reaction flask is not connected with the Schlenk line, an empty balloon is connected with the flask, which is able to expand and accommodate additional gas volume without allowing additional air into the flask.

All liquid transfer is preferably carried out with oxygenated syringes (just removed from package). Moreover, in preferred manner, if the reaction is carried out in reaction flasks connected with the Schlenk line, the wafers undergo the vacuum-nitrogen cycles in order to provide an inert atmosphere during the further reaction. In this case, no empty balloon is needed to accommodate overpressure.

When working with flat bottom reaction glasses, better coating homogeneity is obtained if the wafers are placed up-side down, this means with the functionalized area pointing to the bottom of the reacting glass.

In principle, the graft polymerization may be performed according to any technique known to a person skilled in the art. However, particularly good results are obtained, if the graft polymerization is performed as atom transfer radical polymerization.

Due to its advantageous properties, which are described above, the agent according to the present invention may be used in mechanical engineering, preferably in precision engineering and most preferably in the clock- and/or watchmaking sector.

Due to the same reasons, also the article according to the present invention may be used in mechanical engineering, preferably in precision engineering and most preferably in the clock- and/or watchmaking sector.

Subsequently, the present invention is described in more detail by means of examples, which shall illustrate, but not limit the present invention.

DETAILED DESCRIPTION OF THE PREFERRED EMBODIMENTS

Dimethylchlorosilane (Aldrich-Fine Chemicals, 98%), 10-undecen-1-ol (Aldrich-Fine Chemicals, 98%), 2-bromo-2-methylpropionyl bromide (Acros Organics, 98%) and chloroplatinic acid hexahydrate (ABCR Deutschland 99.9%) used for the initiator synthesis were used as received from the suppliers.

3,3,4,4,5,5,6,6,7,7,8,8,9,9,10,10,10-heptadecafluorodecyl acrylate was freed from the inhibitor by passing through a column filled with alumina using acetone as eluent and removal of the eluent in vacuum.

Copper (II) bromide (Sigma-Aldrich, 99%) was used as received. Copper (I) bromide (Aldrich-Fine Chemicals, 5N) was purified by washing in glacial acetic acid. Therefore, 4 g of CuBr were suspended in 400 ml of acetic acid and the resulting mixture was stirred at room temperature overnight. Afterwards CuBr was separated by filtration using filter paper, subsequently washed with methanol and diethyl ether and dried under vacuum. The so obtained CuBr was stored at room temperature under inert gas.

The synthesis of 11-(2-bromo-2-methyl-propionyl)-dimethylchlorosilane initiator (BPCS) having a dimethylchlorosilane anchor group was performed following a two-step protocol described by Sanjuan (Lang-muir 2007, 23, 5769-5778 Sanjuan et al.).

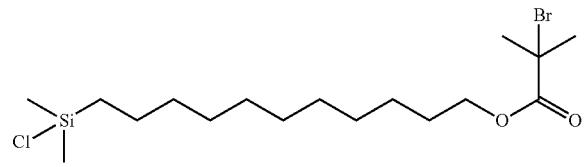 [SMILES: CC(C)(Br)C(=O)OCCCCCCCCCCC[Si](C)(C)Cl]

To 10.7 ml of 10-undecen-1-ol in 50 ml of dry tetrahydrofuran (Sigma Aldrich, 98%), 9 ml (60 mmol) of triethylamine (Sigma Aldrich, 99.5%) were added, followed by a dropwise addition of a solution of 7 ml of 2-bromo-2-methylpropionyl bromide in 20 ml of dry tetrahydrofuran. The mixture was stirred under inert gas for 24 hours and diluted with 100 ml of hexane, washed twice with 100 ml of 2 M HCl (prepared by adding 42 ml of 37% HCl to 208 ml of H2O) and washed 4 times with 100 ml of ultra-pure water. The organic phase was separated and dried over magnesium sulfate for 60 minutes before being filtered using a filter paper and concentrated at 130 mbar at 40° C. The obtained crude product was purified by passing through a silica column (silica gel 60, diameter 80 mm, height ca. 27 cm, eluent: 1.5 l of dichloromethane, gravity). After removal of the eluent in vacuum 10-undecen-1-yl-2-bromo-2-methylpropionate was obtained as a colourless oily product which was stored under inert gas at 4° C. until the second step described in the following.

In the second reaction step 2.54 g of the 10-undecen-1-yl-2-bromo-2-methylpropionate obtained in the preceding step were added to 10 mg of chloroplatinic acid hexahydrate and 7.93 ml of dimethylchlorosilane. The so obtained mixture was stirred overnight in the dark under inert gas and filtered through a silica plug without using additional solvent. The excess of unreacted silane was removed by drying under vacuum for 24 hours.

The obtained 11-(2-bromo-2-methyl-propionyl)-dimethylchlorosilane initiator (BPCS) was stored at −20° C. in a container filled with inert gas and sealed with parafilm at −20° C.

EXAMPLE (i) Bonding of the Initiator to a Silicon Surface

Silicon article (P/B<100>, Si-Mat Silicon Wafers, Germany) were washed 3 times with isopropanol in the sonication bath, treated for 30 minutes in a UV ozone cleaner (UV/Ozone ProCleaner™ and ProCleaner™ Plus, IA, USA). The so obtained cleaned articles were immediately immersed in a 10 mM solution of the BPCS initiator in freshly distilled toluene and incubated under an inert atmosphere for 24 hours. This was followed by five times washing in toluene performed by immersing into five different baths of toluene for a few minutes and, while being immersed in the last of the five baths, a brief sonication for 20 seconds in order to remove the weakly bound molecules, and final rinsing with isopropanol. The so prepared samples were dried with a stream of nitrogen and stored under an inert atmosphere in the dark in a parafilm-sealed box before being used within seven days.

The BPCS-initiator-functionalized silicon surface obtained according to the preceding protocol was characterized by a static-contact-angle (CA) measurement. This measurement performed on a BPCS layer adsorbed on a UV/ozone-cleaned ultra-hydrophilic silicon surface, which before being immersed into the solution of the BPCS initiator had an initial contact angle of below 3°, resulted in a contact angle of 77°±2°.

The thickness of the BPCS layer was determined to be 1.8±0.1 nm by using a variable-angle spectroscopic ellipsometer (VASE) (M-2000F, LOT Oriel GmbH, Darmstadt, Germany). The ellipsometric measurement data were collected at three different angles of incidence 65°, 70° and 75°, and the incident wavelength was varied between 995 and 370 nm. The obtained thickness values is a result of a fit to a three-layer model, Si jell/SiO2/Cauchy, defined in the WVASE32 software (LOT Oriel GmbH, Darmstadt, Germany).

(ii) Graft Atom Transfer Radical Polymerization of 3,3,4,4,5,5,6,6,7,7,8,8,9,9,10,10,10-Heptadecafluorodecyl Acrylate At ambient conditions 2.9 ml (4.75 g) of 3,3,4,4,5,5,6,6,7,7,8,8,9,9,10,10,10-heptadecafluorodecyl acrylate, 11.3 ml of cyclohexanone and 167 μl (138 mg) of N,N,N',N',N"-pentamethyldiethylenetriamine (PMDETA) were added to a flask which was sealed with a rubber septum. The resulting solution was subjected to four freeze-pump-thaw cycles before being transferred to a second flask containing 57.4 mg of copper (I) bromide and 10.0 mg of copper (II) bro-mide under an inert atmosphere. The obtained solution was stirred for 5 minutes under heating with a hot oil bath having a temperature of 110° C. to achieve a dark brown homogeneous mixture. 4 ml of this mixture were transferred to the BPCS-modified silicon article sample prepared in step (i) being placed in a 20 ml Schlenk tube under an inert atmosphere using an oxygen-free syringe. The reaction was kept at 110° C. under an inert atmosphere for three hours. The reaction was quenched by exposure to air atmosphere and addition of toluene, and the obtained article, i.e. a silicon substrate having attached to its surface via a silane moiety the polymer resulting from the aforementioned reaction, was separated from the mixture.

(iii) Purification

The article obtained in the preceding step (ii) was subjected to purification in order to remove the non-bonded material. The purification can be performed by immersing the obtained article in dichloromethane under sonication for 15 minutes which was performed all in all three times before the article was dried. Other kind of purification can be alternatively performed.

The thickness of the surface-bound polymer coating was determined to be between 5 to 30 nm using a variable-angle spectroscopic ellipsometer (VASE) (M-2000F, LOT Oriel GmbH, Darmstadt, Germany).

Furthermore, the contact angles for water, benzyl alcohol ethyleneglycol, Moebius oil 9010 and Moebius testöl 3 were determined, the results being presented in the following table:

| Liquid | Contact angle after fabrication | Contact angle after several cleanings |
| --- | --- | --- |
| Water | 125° | N/A |
| Benzyl alcohol | 108° | N/A |
| Ethyleneglycol | 96° | N/A |
| Moebius oil 9010 | 84° | 86° |
| Moebius testöl 3 | 72° | 73° |

It appears that, even after several cleanings, the contact angles remain globally unchanged.

Of course, the present invention is not limited to the illustrated example but may be subject to various variants and alterations, which will be apparent to those skilled in the art. In particular, reaction conditions can be adapted regarding mono- and polymers and/or anchor group and/or cross-linker and/or substrates used.

The invention claimed is:

1. An article comprising a substrate having at least one surface, wherein at least part of said at least one surface is coated with an agent for the surface epilamization of an article comprising one or more molecules having the general formula (1):

A-F (1)

wherein:
A is an anchor group comprising a moiety selected from the group consisting of silane groups, hydroxyl groups, catechol groups, phosphate groups, phosphonate groups, carboxylic acid groups, amine groups, thiol groups and any combination of two or more of the aforementioned groups and
F is a functionalizing group, wherein the functionalizing group com-prises a branched polymer having a backbone and at least two side groups, wherein at least one of the side groups is a C4-20 hydrocarbon group or a perhalogenated C4-20 hydrocarbon group; and in that the agent includes, as epilame function, at least one side group that is a partially fluorinated hydrocarbon group.

2. The article according to claim 1, wherein at least one, preferably at least 50%, more preferably at least 80%, even more preferably at least 90% and most preferably all of the side groups are a C4-18 hydrocarbon group, more preferably a C6-16 hydrocarbon group and most preferably a C8-14 hydrocarbon group.

3. The article according to claim 1, wherein the at least one side group is a partially fluorinated hydrocarbon group and preferably a perfluorinated hydrocarbon group.

4. The article according to claim 1, wherein the hydrocarbon group is an alkyl ester group and preferably a linear alkylester group.

5. The article according to claim 4, wherein the hydrocarbon group is selected from the group consisting of acrylate esters, methacrylate esters, styrene derivatives having at least one alkyl group attached to the aromatic ring and any combination of two or more of the aforementioned groups.

6. The article according to claim 1, wherein the branched polymer comprises 2 to 50, preferably 3 to 30, more preferably 4 to 20, even more preferably 5 to 15 and most preferably 7 to 13 side groups.

7. The article according to claim 6, wherein all of the side groups are, the same or different, $C_{4-10}$ hydrocarbon groups, preferably $C_{3-9}$ hydrocarbon groups and most preferably $C_{4-8}$ hydrocarbon groups.

8. Article according to claim 1, wherein all of the side groups are partially fluorinated hydrocarbon groups and preferably perfluorinated hydrocarbon groups.

9. The article according to claim 1, wherein at least one of the side groups has at least one functional group which is capable of cross-linking with another molecule of the agent having the general formula (1), wherein the branched polymer comprises at least one block comprising at least 5 and preferably at least 10 side groups, wherein at least 2 of these side groups comprise each at least one functional group which is capable of cross-linking with another molecule of the agent having the general formula (1).

10. The article according to claim 9, wherein the branched polymer contains at least one further block comprising at least 5 and preferably at least 10 side groups, wherein all side groups of this at least one further block do not contain functional groups being capable of cross-linking with another molecule of the branched polymer, wherein the branched polymer more preferably contains two of the further blocks each of which comprising at least 5 and preferably at least 10 side groups, wherein all side groups of these further blocks do not contain functional groups being capable of cross-linking with another molecule of the branched polymer, wherein the block comprising at least 5 and preferably at least 10 side groups, wherein at least 2 of these side groups comprise each at least one functional group which is capable of cross-linking with another molecule of the agent having the general formula (1), is arranged between the two further blocks.

11. The article according to claim 1, wherein the at least one surface being coated with the agent is composed of a material selected from the group consisting of silicon, diamond-like carbon, silicon carbide, sapphire, steel, metal-coated steel, nickel-plated steel, ruby, aluminium oxide, iron oxide, a magnesium alloy, silicon oxide, niobium oxide, titanium oxide, a polymer and any combination of two or more of the aforementioned materials.

12. A method for producing an article according to claim 1 comprising the steps of:
   a) providing a substrate having at least one surface,
   b) bonding at least one anchor group selected from the group consisting of silane groups, hydroxyl groups, catechol groups, phosphate groups, phosphonate groups, carboxylic acid groups, amine groups, thiol groups and any combination of two or more of the aforementioned groups onto at least one of the at least one surface of the substrate,
   c) providing at least one kind of monomer and
   d) graft polymerizing the at least one kind of monomer onto the at least one anchor group to form at least a branched polymer which is covalently bonded to the at least one anchor group.

13. A method for producing an article according to claim 1 comprising the steps of:
   c') providing at least one kind of monomer,
   d') graft polymerizing the at least one kind of monomer onto the at least one anchor group selected from the group consisting of silane groups, hydroxyl groups, catechol groups, phosphate groups, phosphonate groups, carboxylic acid groups, amine groups, thiol groups and any combination of two or more of the aforementioned groups to form at least one branched polymer which is covalently bonded to the at least one anchor group,
   a') providing a substrate having at least one surface and
   b') bonding said at least one anchor group onto at least one of the at least one surface of the substrate.

14. A method for producing an article according to claim 1 comprising the steps of:
   d') graft polymerizing the at least one kind of monomer in order to form at least one branched polymer,
   a) providing a substrate having at least one surface,
   b) bonding at least one anchor group selected from the group consisting of silane groups, hydroxyl groups, catechol groups, phosphate groups, phosphonate groups, carboxylic acid groups, amine groups, thiol groups and any combination of two or more of the aforementioned groups onto at least one of the at least one surface of the substrate and
   e) bonding said at least one branched polymer onto said at least one anchor group.

15. A timepiece comprising an article according to claim 1.

* * * * *